United States Patent
Jiang et al.

(10) Patent No.: US 8,895,147 B2
(45) Date of Patent: *Nov. 25, 2014

(54) ELASTIC DEVICE USING CARBON NANOTUBE FILM

(75) Inventors: Kai-Li Jiang, Beijing (CN); Chen Feng, Beijing (CN); Lin Xiao, Beijing (CN); Zhuo Chen, Beijing (CN); Liang Liu, Beijing (CN); Shou-Shan Fan, Beijing (CN); Qun-Qing Li, Beijing (CN); Li Qian, Beijing (CN); Kai Liu, Beijing (CN); Yang Wei, Beijing (CN)

(73) Assignees: Tsinghua University, Beijing (CN); Hon Hai Precision Industry Co., Ltd., New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/450,737

(22) Filed: Apr. 19, 2012

(65) Prior Publication Data

US 2012/0202050 A1     Aug. 9, 2012

Related U.S. Application Data

(63) Continuation of application No. 12/583,391, filed on Aug. 20, 2009, now Pat. No. 8,815,398.

(30) Foreign Application Priority Data

Nov. 14, 2008    (CN) .......................... 2008 1 0217820

(51) Int. Cl.
     *B32B 9/00*          (2006.01)
     *G06F 3/045*        (2006.01)
     *B82Y 30/00*       (2011.01)

(52) U.S. Cl.
     CPC ................. *G06F 3/045* (2013.01); *B82Y 30/00* (2013.01)
     USPC .......................................... 428/408; 423/448

(58) Field of Classification Search
     USPC .................... 428/408; 423/448, 447.1, 447.2; 977/742
     See application file for complete search history.

(56) References Cited

U.S. PATENT DOCUMENTS

| | | | |
|---|---|---|---|
| 7,045,108 B2 * | 5/2006 | Jiang et al. ................. | 423/447.2 |
| 2003/0122111 A1 * | 7/2003 | Glatkowski .................. | 252/500 |
| 2007/0166223 A1 | 7/2007 | Jiang et al. | |
| 2008/0170982 A1 | 7/2008 | Zhang et al. | |

FOREIGN PATENT DOCUMENTS

| | | |
|---|---|---|
| TW | 200724486 | 7/2007 |
| WO | WO 2007/015710 | * 2/2007 |

\* cited by examiner

*Primary Examiner* — Daniel H Miller
(74) *Attorney, Agent, or Firm* — Novak Druce Connolly Bove + Quigg LLP (57) ABSTRACT

An elastic device includes a first elastic supporter; a second elastic supporter and a carbon nanotube film. The second elastic supporter is spaced from the first elastic supporter. The carbon nanotube film has a first side fixed on the first elastic supporter and a second side opposite to the first side and fixed on the second elastic supporter. The carbon nanotube film includes a plurality of first carbon nanotubes orientated primarily along a first direction and a plurality of second carbon nanotubes having orientations different from the first direction. At least one portion of each of the second carbon nanotubes contacts with at least two adjacent first carbon nanotubes. The carbon nanotube film is capable of elastic deformation along a second direction that is substantially perpendicular to the first direction.

20 Claims, 7 Drawing Sheets

ELASTIC DEVICE USING CARBON NANOTUBE FILM

RELATED APPLICATIONS

This application is a continuation application of U.S. patent application Ser. No. 12/583391, filed Aug. 20, 2009, entitled, "CARBON NANOTUBE FILM," which claims all benefits accruing under 35 U.S.C. §119 from China Patent Application No. 200810217820.0, filed on Nov. 14, 2008 in the China Intellectual Property Office.

BACKGROUND

1. Technical Field

The present disclosure relates to nanomaterial films, elastic device using the same and methods for stretching the same and, particularly, to a carbon nanotube film, elastic device using the same and a method for stretching the same.

2. Discussion of Related Art

Carbon nanotubes have received a great deal of interest since the early 1990s. Carbon nanotubes have interesting and potentially useful electrical and mechanical properties. Due to these and other properties, carbon nanotubes have become a significant focus of research and development for use in electron emitting devices, sensors, and transistors.

Generally, carbon nanotubes prepared by conventional methods are in particle or powder form. The particle or powder-shaped carbon nanotubes limit the applications the carbon nanotubes can be used. Thus, preparation of macro-scale carbon nanotube structures has attracted lots of attention.

Carbon nanotube yarn is one important macro-scale carbon nanotube structure. Examples of a method for making the carbon nanotube yarn is taught by U.S. Pat. No. 7,045,108 to Jiang et al. The carbon nanotube yarn is directly drawn from a carbon nanotube array. The carbon nanotube yarn includes a plurality of carbon nanotubes joined end-to-end by van der Waals attractive forces therebetween. Specifically, the carbon nanotube yarn includes a plurality of successively oriented carbon nanotube segments joined end-to-end by van der Waals attractive force therebetween. Each carbon nanotube segment includes a plurality of carbon nanotubes parallel to each other, and combined by van der Waals attractive force therebetween. The length of the carbon nanotube yarn can vary. However, the width of the carbon nanotube yarn is related to a size of the carbon nanotube array.

Carbon nanotube film is another important macro-scale carbon nanotube structure. Examples of a method for making the carbon nanotube film is taught by US patent application 2008/0170982 to Zhang et al. The carbon nanotube film also can be prepared by drawing from a carbon nanotube array. The length of the carbon nanotube film can be varied. However, both the width of the carbon nanotube film and the carbon nanotube yarn are restricted by a size of the carbon nanotube array. Nowadays, the size of carbon nanotube arrays is limited to about 4 inches, which is not conducive to preparing carbon nanotube films with large area.

What is needed, therefore, is a carbon nanotube film without limit in size.

BRIEF DESCRIPTION OF THE DRAWINGS

Many aspects of the present carbon nanotube film can be better understood with references to the following drawings. The components in the drawings are not necessarily drawn to scale, the emphasis instead being placed upon clearly illustrating the principles of the present carbon nanotube film.

Corresponding reference characters indicate corresponding parts throughout the several views. The exemplifications set out herein illustrate at least one embodiment of the present carbon nanotube film, in at least one form, and such exemplifications are not to be construed as limiting the scope of the invention in any manner.

DETAILED DESCRIPTION

References will now be made to the drawings to describe, in detail, embodiments of the present carbon nanotube film.

Referring to FIG. 1 through FIG. 4, one embodiment of a carbon nanotube film 10 includes a plurality of carbon nanotubes 100. The carbon nanotubes 100 include a plurality of first carbon nanotubes 102 and a plurality of second carbon nanotubes 104. The plurality of first carbon nanotubes 102 are uniformly distributed in the carbon nanotube film 10 and arranged primarily along a first direction D1. Specifically, the first carbon nanotubes 102 are joined end-to-end substantially along the first direction D1 and combined by van der Waals attractive force therebetween. The plurality of second carbon nanotubes 104 is uniformly distributed in the carbon nanotube film 10. Orientation of the second carbon nanotubes 104 is such that most of the plurality of second carbon nanotubes 104 contacts with at least two adjacent first carbon nanotubes 102. Specifically, most of the plurality of second carbon nanotubes 104 contacts with at least two adjacent first carbon nanotubes 102 via van der Waals attractive force therebetween. Thus, the orientation of the second carbon nanotubes 104 is different from that of the first carbon nanotubes 102. The second carbon nanotubes 104 and the first carbon nanotubes 102 in the carbon nanotube film 10 form a grid like structure, thereby forming a free-standing structure. The carbon nanotube film 10 having a free-standing structure means that the carbon nanotube film 10 can maintain a film structure if part of the carbon nanotube film 10 is located on a supporter and the structure of the carbon nanotube film 10 will not change. For example, if the carbon nanotube film 10 is placed on a frame or two separate supporters, part of the carbon nanotube film 10 which is not in contact with the frame or two separate supporting elements would be suspended between parts of the frame or between two supporters and yet will maintain film structure integrity.

Figure 1:
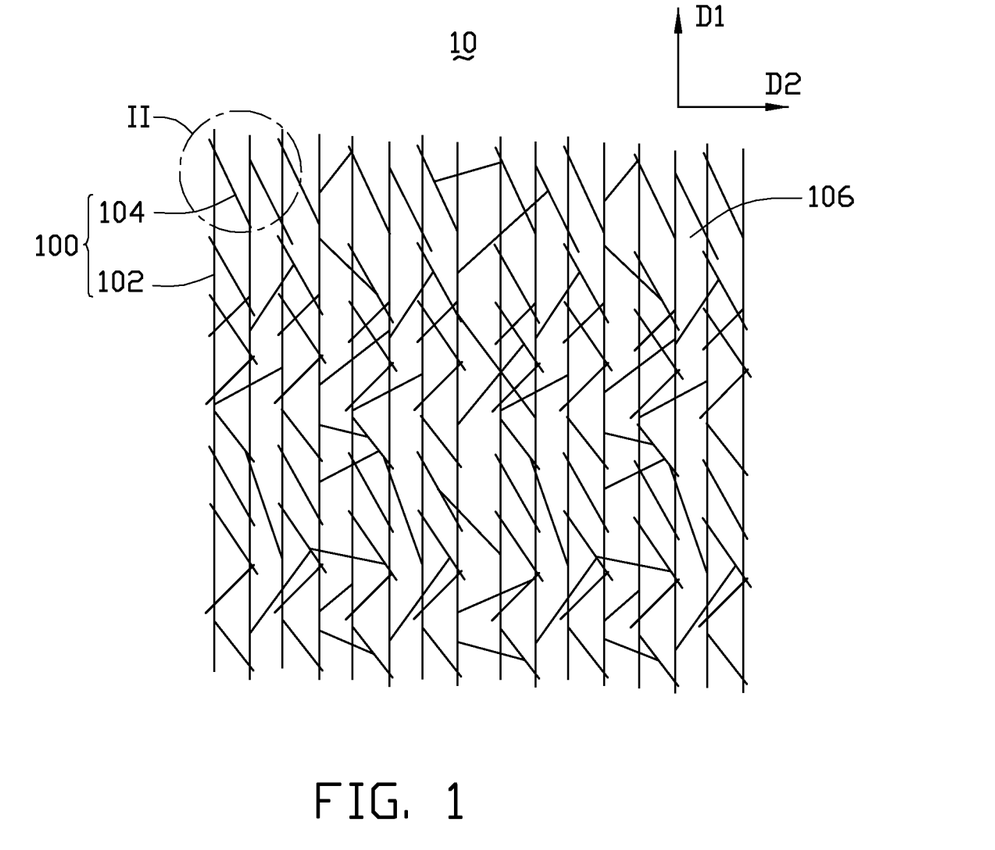
FIG. 1 is a schematic view of one embodiment of a carbon nanotube film.
Figure 2:
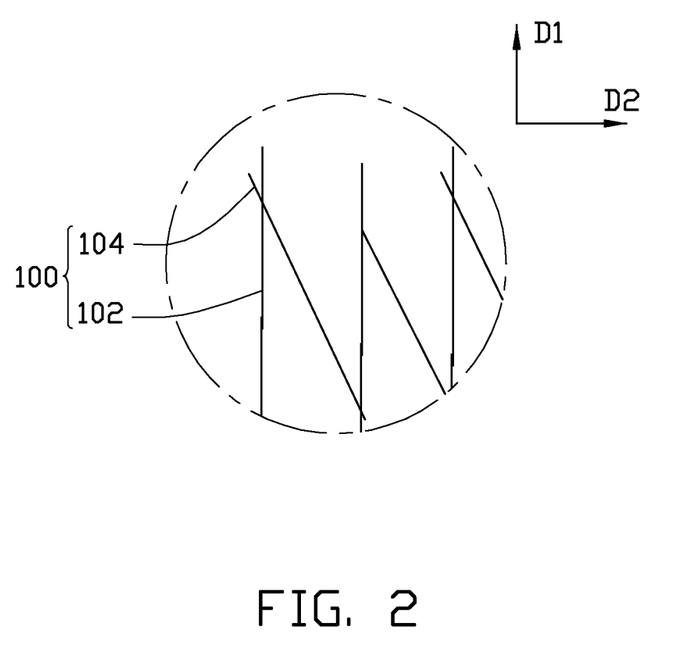
FIG. 2 is a schematic view of part of the carbon nanotube film of FIG. 1.
Figure 3:
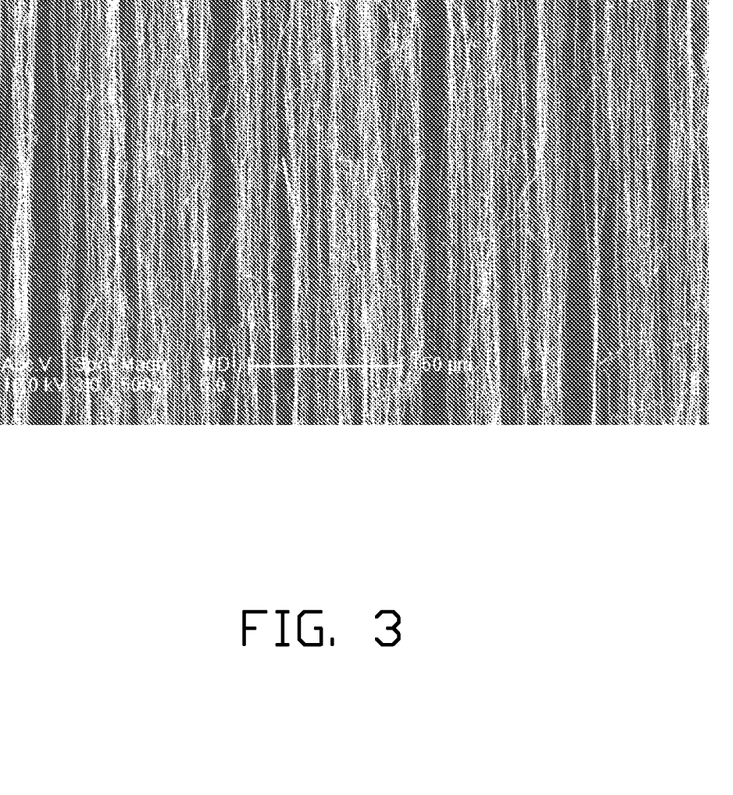
FIG. 3 is a Scanning Electron Microscope (SEM) image of a carbon nanotube film before being stretched.

The second carbon nanotubes 104 and the first carbon nanotubes 102 in the carbon nanotube film 10 can form a plurality of gaps 106. The carbon nanotube film 10 can be stretched substantially along a second direction D2 while still maintaining a film structure because of the existence of the plurality of second carbon nanotubes 104. The second direction D2 is substantially perpendicular to the first direction D1. During the stretching process, the distance between adjacent first carbon nanotubes 102 changes, and accordingly, the size of the gaps 106 changes. Specifically, the distance between the adjacent first carbon nanotubes 102 and the size of the gaps 106 increase with the deformation of the carbon nanotube film 10 along the second direction D2. A distance between adjacent first carbon nanotubes 102 (e.g., distance along the second direction D2) can range from about 0 micrometers to about 50 micrometers. A ratio of the number of the first carbon nanotubes 102 and that of the second carbon nanotubes 104 is in a range from about 2:1 to about 6:1. In the present embodiment, a ratio of the number of the first carbon nanotubes 102 and that of the second carbon nanotubes 104 is 4:1.

The length and the thickness of the carbon nanotube film 10 can be varied. The width of the carbon nanotube film 10 is related to the size of a carbon nanotube array from which the carbon nanotube film 10 is drawn. A thickness of the carbon nanotube film 10 can be in a range from about 0.5 nanometers to about 1 millimeter. A diameter of the carbon nanotubes 100 in the carbon nanotube film 10 ranges from about 0.5 nanometers to about 50 micrometers. A length of the carbon nanotubes 100 in the carbon nanotube film 10 ranges from about 50 micrometers to about 5 millimeters.

The deformation of the carbon nanotube film 10 along the second direction D2 is related to the thickness and the density of the carbon nanotube film 10. The greater the thickness and the density of the carbon nanotube film 10, the larger the deformation of the carbon nanotube film 10 along the second direction D2. Further, the deformation of the carbon nanotube film 10 can also be related to the mass ratio of the second carbon nanotubes 104. Among a range of a mass ratio of the second carbon nanotubes 104 to the carbon nanotubes 100, the greater the number of the second carbon nanotubes 104, the greater the deformation of the carbon nanotube film 10 along the second direction D2. In one embodiment, the range of a mass ratio of the second carbon nanotubes 104 to the carbon nanotubes 100 is about 14% to about 33%. The deformation of the carbon nanotube film 10 along the second direction D2 can reach up to about 300% (e.g., the carbon nanotube film 10 can be stretched to less than or equal to 300% of its original size). Electrical resistance of the carbon nanotube film 10 before and after being stretched is almost the same. In the present embodiment, a thickness of the carbon nanotube film 10 is about 50 nanometers, and the deformation of the carbon nanotube film 10 along the second direction D2 can be up to 150%.

Figure 7:
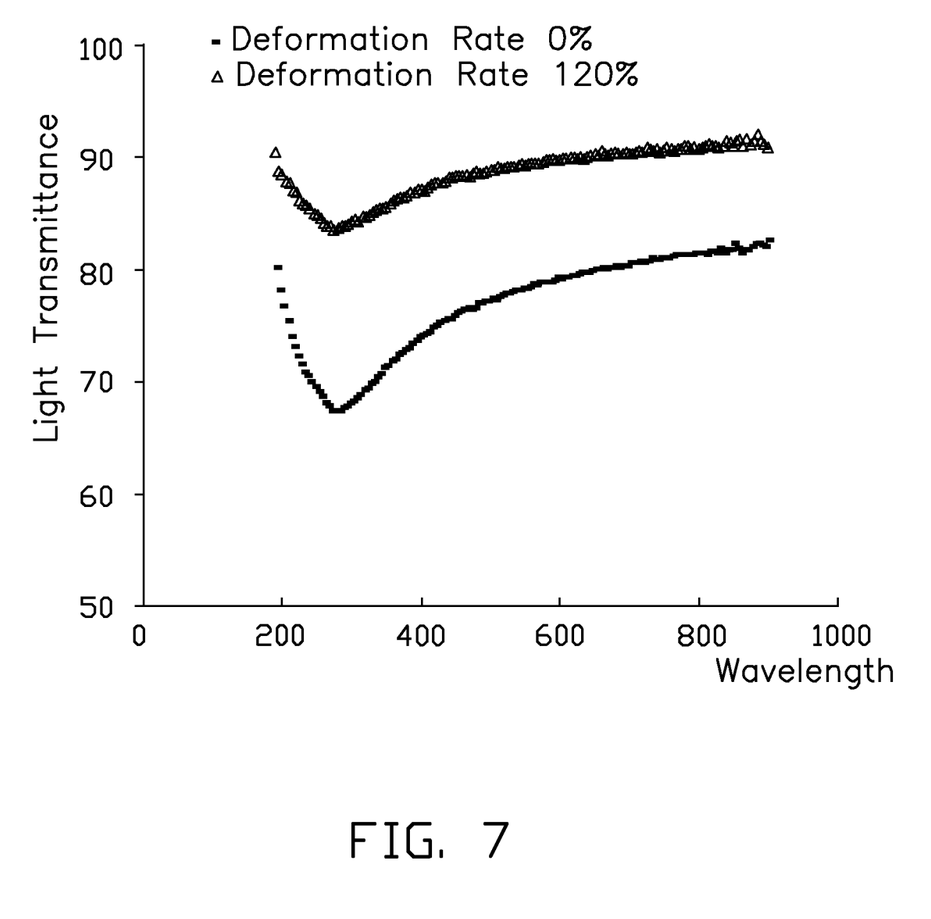
FIG. 7 is a schematic view of the light transmittance of the carbon nanotube film before and after being stretched.

A light transmittance (transmitting ratio of visible light) of the carbon nanotube film 10 is related to the thickness and the density of the carbon nanotube film. The larger the thickness and density of the carbon nanotube film 10, the lower the light transmittance of the carbon nanotube film. Further, the light transmittance of the carbon nanotube film 10 may also be related to the number of the second carbon nanotubes 104 and the gaps 106. The larger the size of the gaps 106, the fewer the number of the second carbon nanotubes 104, and the higher the light transmittance of the carbon nanotube film 10. The light transmittance of the carbon nanotube film 10 can be in a range from about 60% to about 95%. Referring to FIG. 7, in the present embodiment, if the thickness of the carbon nanotube film 10 is about 50 nanometers, the light transmittance of the carbon nanotube film 10 before being stretched is in a range from about 67% to about 82%. If deformation of the carbon nanotube film 10 along the second direction D2 is 120%, the light transmittance of the carbon nanotube film 10 is in a range from about 84% to about 92%. Using green light with a wavelength of 550 nanometers as an example, green light transmittance of the carbon nanotube film 10 before being stretched is about 78%. If deformation of the carbon nanotube film 10 along the second direction D2 is about 120%, the green light transmittance of the carbon nanotube film 10 increases to about 89%.

Since the carbon nanotube film 10 can be stretched along the second direction D2, the carbon nanotube film 10 can be used in elastic and tensible elements/equipments. The carbon nanotube film 10 after being stretched has a high light transmittance, and can be used in a device requiring high light transmittance, such as touch panels.

Figure 5:
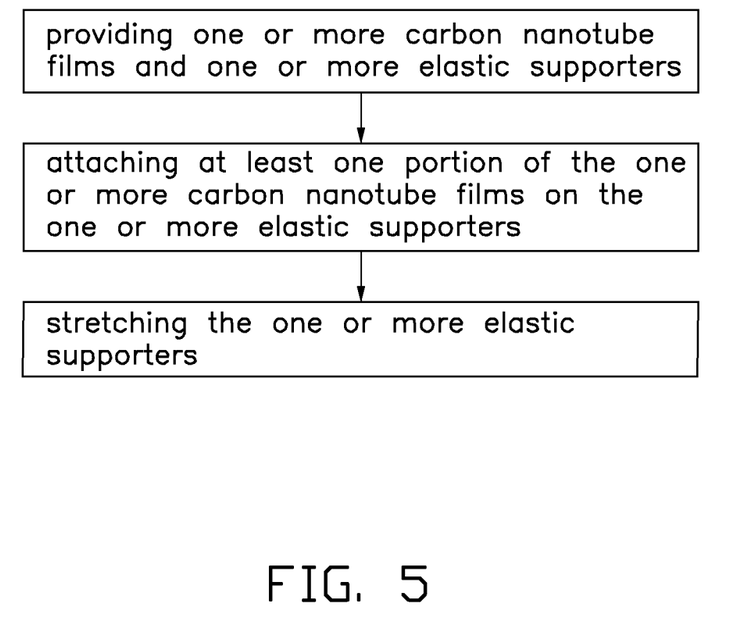
FIG. 5 is a flow chart of one embodiment of a method for stretching the carbon nanotube film.
Figure 6:
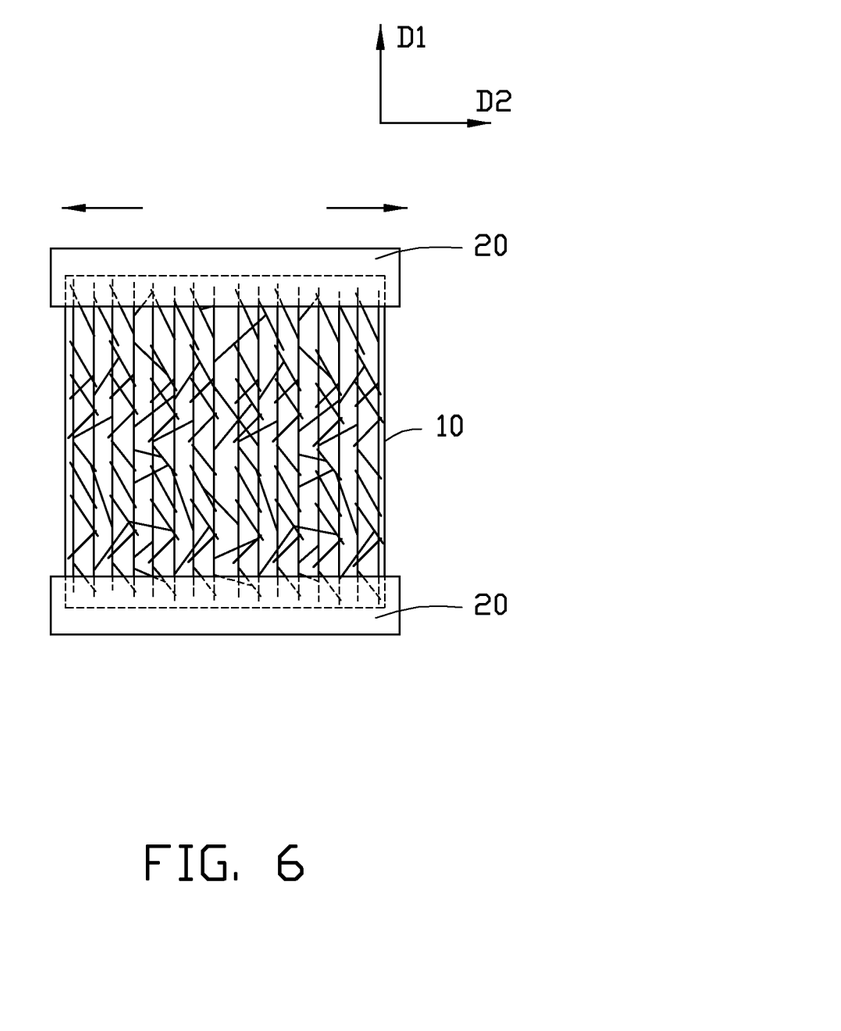
FIG. 6 is a schematic view of the carbon nanotube film stretched.

Referring to FIGS. 5 and 6, one embodiment of a method for stretching the carbon nanotube film 10 includes (a) providing one or more carbon nanotube films 10 and one or more elastic supporters 20, (b) attaching at least one portion of the one or more carbon nanotube films 10 on the one or more elastic supporters 20, and (c) stretching the one or more elastic supporters 20.

In step (a), a shape and a structure of the elastic supporters 20 can be varied. The elastic supporters 20 can have a planar structure or a curved structure. The elastic supporters 20 can be elastic rubber elements, springs, or elastic bands. The elastic supporters 20 can be used to support and stretch the carbon nanotube film 10. Specifically, the elastic supporters 20 can be stretched along the second direction D2.

In step (b), the one or more carbon nanotube films 10 can be directly located on and contacted with a surface of the elastic supporters 20 when the elastic supporters 20 have a planar surface such as an elastic rubber. The one or more carbon nanotube films 10 also can be partly located on and contacted with the surface of the elastic supporters 20, for example, placed between two separately placed elastic supporters 20, e.g., springs, or elastic bands. Since the carbon nanotubes have a large specific area, the carbon nanotube film 10 is adhesive, and can be adhered directly on the elastic supporters 20. Further, it can be understood that the carbon nanotube film 10 can be better adhered on the elastic supporters 20 with an adhesive. Two or more carbon nanotube films 10 can also be stacked along a substantially same direction to form a multi-layer carbon nanotube film. The first carbon nanotubes 102 in the adjacent two carbon nanotube films 10 of the multi-layer carbon nanotube film are substantially arranged along a same direction. The multi-layer carbon nanotube film has a larger thickness than one single carbon nanotube film 10, thus, it can be understood that the deformation of the multi-layer carbon nanotube film will be larger than that of one single carbon nanotube film 10.

In the present embodiment, the two elastic supporters 20 are two springs. One carbon nanotube film 10 is attached to the two elastic supporters 20. Referring to FIG. 6, the two elastic supporters 20 are separately located and substantially parallel to each other. The two elastic supporters 20 are substantially arranged along the second direction D2. Two ends of the carbon nanotube film 10 along the first direction D1 are secured on the two elastic supporters 20 by an adhesive. The first carbon nanotubes 102 in the carbon nanotube film 10 can extend from one elastic supporter 20 to the other elastic supporter 20.

In step (c), the elastic supporters 20 can be fixed on a stretching device (not shown). The stretching device is used to stretch the elastic supporters 20. In one embodiment, the two elastic supporters 20 are fixed on the stretching device.

The stretching rate depends on the carbon nanotube film 10 to be stretched. The stretching rate cannot be too high, otherwise the carbon nanotube film 10 may break. The stretching rate can be less than 10 centimeters per second (cm/s). In one embodiment, the stretching rate is about 2 cm/s.

The stretching direction is closely related to the arranged direction of the first carbon nanotubes 102 of the carbon nanotube film 10. The stretching direction is generally perpendicular to the arranged direction of the first carbon nanotubes 102, e.g., along the second direction D2.

Since the at least one carbon nanotube film 10 is secured on the elastic supporters 20, when the elastic supporters 20 are uniformly stretched along the second direction D2, the at least one carbon nanotube film 10 is also stretched along the same direction. In the carbon nanotube film 10, during the stretching process, the second carbon nanotubes 104 and the first carbon nanotubes 102 maintain contact with each other, and the distance between the adjacent first carbon nanotube 102 is increased, because the first carbon nanotubes 102 are joined end to end, and the second carbon nanotubes 104 contact two or more adjacent first carbon nanotubes 102 by van der Waals attractive force therebetween, and the second carbon nanotubes 104 and the first carbon nanotubes 102 form a plurality of gaps 106. The distance between the adjacent first carbon nanotubes 102 before being stretched can be in a range from about 0 micrometers to about 10 micrometers. The distance between the adjacent first carbon nanotubes 102 after being stretched can reach about 50 micrometers. The carbon nanotube film 10 maintains a film structure during the stretching process.

Figure 4:
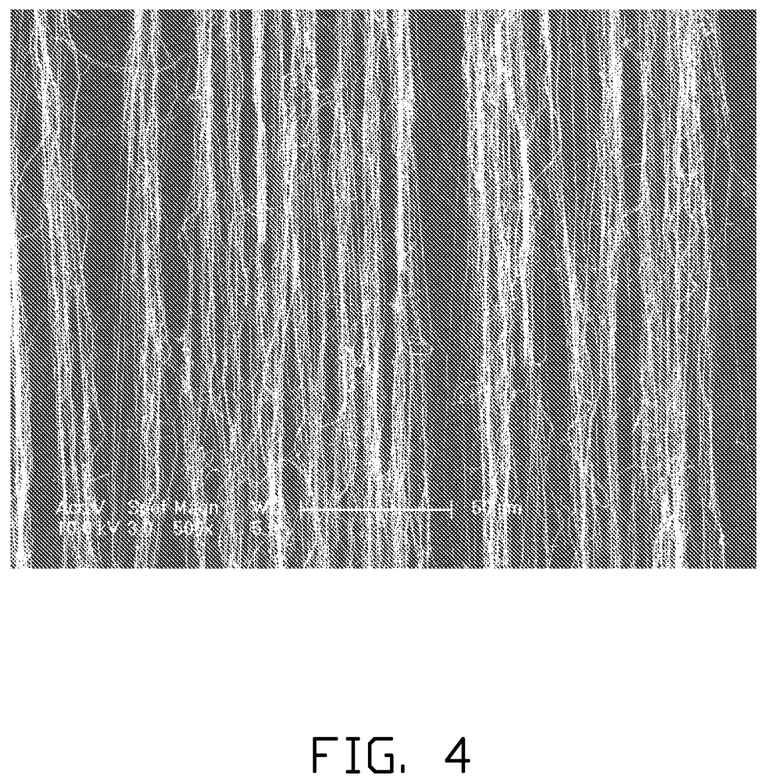
FIG. 4 is a Scanning Electron Microscope (SEM) image of a carbon nanotube film after being stretched.

If two or more carbon nanotube films 10 are stacked with each other to form a multi-layer carbon nanotube film, the carbon nanotubes 100 in the multi-layer carbon nanotube film have a more uniform distribution and a higher density, thus the multi-layer carbon nanotube film have a high deformation. The deformation of the carbon nanotube film 10 along the second direction D2 can be up to approximately 300%. In one embodiment, the deformation of the carbon nanotube film 10 along the second direction D2 can be in a range from about 25% to 150%. FIG. 4 is a SEM image of a carbon nanotube film 10 after being stretched/deformed 120%. Comparing to FIG. 3, the distance between the adjacent first carbon nanotubes 102 after being stretched is greater than that before being stretched. Referring to FIG. 7, if deformation of the carbon nanotube film 10 is about 120%, the light transmittance of the carbon nanotube film 10 is in a range from about 84% to about 92%, to light having a wavelength ranging from about 190 nanometers to about 900 nanometers. Electrical resistance of the carbon nanotube film 10 before and after being stretched is almost the same.

Further, if deformation of the carbon nanotube film 10 is less than about 60%, the distance between the adjacent first carbon nanotubes 102 along the second direction D2 can reach about 20 micrometers. The carbon nanotube film 10 after being stretched can return to an original non-stretched size upon release of the stretching force. The stretching properties of the carbon nanotube film may be widely used where elasticity and resilience of carbon nanotubes would be useful in consumer electronics and other devices.

The carbon nanotube film and the stretching method thereof have a plurality of merits including the following. Firstly, the carbon nanotube film can be stretched by placing one or more carbon nanotube films on one or more elastic supporters and stretching the one or more elastic supporters. This method is simple and has a low cost. Secondly, the carbon nanotube film has a high light transmittance after being stretched, thereby avoiding using complicated methods and expensive instruments, such as laser instruments, to treat the carbon nanotube film to increase the light transmittance thereof. The carbon nanotube film can be used in a device requiring a high light transmittance, such as touch panels. Thirdly, the stretching properties of the carbon nanotube film can be widely used in stretchable consumer electronics and other devices. Lastly, it is conducive to use the method for stretching the carbon nanotube film to acquire a large area carbon nanotube film. The carbon nanotube film is not limited to the size of a substrate on which a carbon nanotube array is grown, the carbon nanotube film being drawn from the carbon nanotube array. The carbon nanotube film can be used in large scale devices.

It is to be understood that the above-described embodiments are intended to illustrate rather than limit the disclosure. Variations may be made to the embodiments without departing from the spirit of the disclosure as claimed. The above-described embodiments illustrate the scope of the disclosure but do not restrict the scope of the disclosure.

It is also to be understood that the above description and the claims drawn to a method may include some indication in reference to certain steps. However, the indication used is only to be viewed for identification purposes and not as a suggestion as to an order for the steps.

What is claimed is:

1. An elastic device, comprising:
a first elastic supporter;
a second elastic supporter spaced from the first elastic supporter; and
a carbon nanotube film, a first side of the carbon nanotube film being fixed on the first elastic supporter, a second side of the carbon nanotube film, opposite to the first side, being fixed on the second elastic supporter, and a middle portion of the carbon nanotube film being suspended between the first elastic supporter and the second elastic supporter, the carbon nanotube film being entirely made of carbon nanotubes and comprising:
a plurality of first carbon nanotubes orientated primarily along a first direction; and
a plurality of second carbon nanotubes, at least one portion of each of the plurality of second carbon nanotubes being in contact with at least two adjacent of the first carbon nanotubes, wherein the plurality of second carbon nanotubes are uniformly dispersed and randomly oriented, and a mass ratio between the plurality of second carbon nanotubes and the carbon nanotube film is in a range from about 14% to about 33% so that the carbon nanotube film is elastically deformable to at least 300% along a second direction that is substantially perpendicular to the first direction.

2. The elastic device of claim 1, wherein the at least one portion of each of the plurality of second carbon nanotubes is attached to the at least two adjacent first carbon nanotubes by van der Waals attractive force therebetween.

3. The elastic device of claim 1, wherein one portion of the plurality of first carbon nanotubes are joined end-to-end substantially and are combined by van der Waals attractive force therebetween.

4. The elastic device of claim 1, wherein the first elastic supporter and the second elastic supporter are elastically deformable along the second direction at least equal to the elastic deformation rate of the carbon nanotube film.

5. The elastic device of claim 1, wherein a distance between adjacent two of the first carbon nanotubes is adjustable.

6. The elastic device of claim 5, wherein the distance between adjacent two of the first carbon nanotubes is adjustable in a range from about 0 micrometers to 50 micrometers.

7. The elastic device of claim 1, wherein the plurality of first carbon nanotubes and the plurality of second carbon nanotubes are uniformly distributed in the carbon nanotube film.

8. The elastic device of claim 1, wherein the plurality of first carbon nanotubes and the plurality of second carbon nanotubes in the carbon nanotubes film form a grid like structure.

9. The elastic device of claim 1, wherein a thickness of the carbon nanotube film is in a range from about 0.5 nanometers to about 1 millimeter.

10. The elastic device of claim 1, wherein a light transmittance of the carbon nanotube film is in a range from about 60% to about 95% for light having a wavelength ranging from about 190 nanometers to about 900 nanometers.

11. The elastic device of claim 1, wherein the carbon nanotube film is free-standing.

12. The elastic device of claim 1, wherein the first elastic supporter and the second elastic supporter are parallel with each other and extend along the second direction.

13. The elastic device of claim 1, wherein the first elastic supporter and the second elastic supporter are elastic rubbers, springs, or elastic bands.

14. An elastic device, comprising:
a elastic supporter;
a carbon nanotube film located on and in contact with a surface of the elastic supporter, wherein the carbon nanotube film is entirely made of carbon nanotubes and comprises:
 a plurality of first carbon nanotubes aligned substantially along a first direction; and
 a plurality of second carbon nanotubes, at least one portion of each of the plurality of second carbon nanotubes being in contact with at least two adjacent of the first carbon nanotubes, wherein the plurality of second carbon nanotubes are uniformly dispersed and randomly oriented, and a mass ratio between the plurality of second carbon nanotubes and the carbon nanotube film is in a range from about 14% to about 33% so that the carbon nanotube film is elastically deformable to at least 300% along a second direction that is substantially perpendicular to the first direction.

15. The elastic device of claim 14, wherein the plurality of first carbon nanotubes are substantially joined end-to-end and combined by van der Waals attractive force therebetween.

16. The elastic device of claim 14, wherein a distance between adjacent two of the first carbon nanotubes is in a range from about 0 micrometers to 50 micrometers.

17. The elastic device of claim 14, wherein a thickness of the carbon nanotube film is in a range from about 0.5 nanometers to about 1 millimeter.

18. The elastic device of claim 14, wherein the carbon nanotube film is free-standing.

19. The elastic device of claim 14, wherein the elastic supporter is elastically deformable equal to or greater than a maximum elastic deformation rate of the carbon nanotube film along the second direction.

20. The elastic device of claim 14, wherein the elastic supporter is a planar structure or a curved structure.

* * * * *